United States Patent Office 3,112,900
Patented Dec. 3, 1963

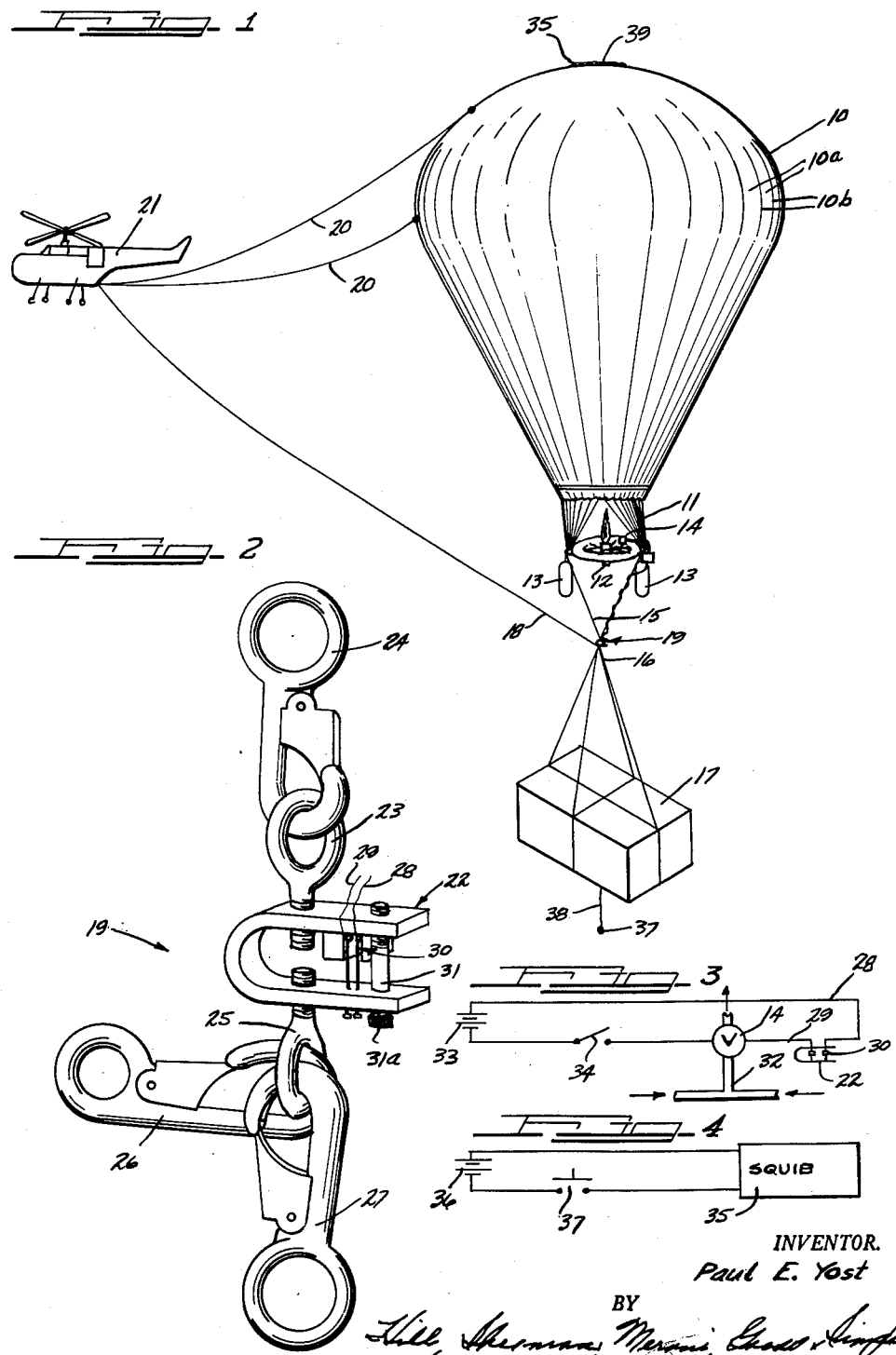

3,112,900
TOWED BALLOON LIFT CONTROL
Paul E. Yost, Sioux Falls, S. Dak., assignor to Raven Industries, Inc., Sioux Falls, S. Dak., a corporation of South Dakota
Filed Sept. 5, 1961, Ser. No. 135,851
10 Claims. (Cl. 244—3)

The present invention relates to a system for transporting heavy loads by air and particularly to a method and apparatus whereby a heavy pay load is lifted by a balloon and towed by a helicopter with a small percentage of the required lift for the pay load being applied by the helicopter tow line and with the net lift from the balloon being automatically adjusted in flight to allow the helicopter to continue to provide the small percentage of required lift.

Transport by air makes it possible to transfer heavy loads over areas of rugged terrain or bodies of water, or to areas where roads have not been built. Heavy loads have been transported by helicopters but a limit of practicality is reached with extremely heavy loads wherein even large helicopters cannot carry the loads or wherein the use of a large helicopter is inconvenient or costly. Balloons are capable of inexpensively lifting loads much heavier than those conveniently carried by helicopters, and in accordance with the present invention heavy pay loads are lifted by balloons and are towed by helicopters which are attached by a tow line to the pay load and provide only a small percentage of the required lift. A preferred form of balloon employed for these heavy lifting jobs is supplied with lifting gas from a burner which can be regulated to change the net lift or free lift of the balloon.

In lifting and transporting the heavy loads, the load on the helicopter must be maintained substantially uniform to avoid loss of control of the helicopter. This is accomplished by automatically adjusting the net lift of the balloon so that it applies a constant lift to the pay load, which is a predetermined lift less than the total weight of the pay load.

A feature of the present invention is the provision of a load sensing device interposed in the load line from the balloon to the pay load, with the tow line from the helicopter attached below the load sensing device, and with the sensing device operating a switch to control a valve and change the fuel fed to the balloon burner as changes are sensed in the net weight of the pay load on the balloon.

An object of the invention is to provide a system employing an improved apparatus and method for transporting very heavy pay loads by air utilizing a combined lifting balloon and towing helicopter.

A further object of the invention is to provide an improved load supporting arrangement for carrying a pay load on a helicopter and balloon which controls the load apportionment and automatically changes the free lift of the balloon to maintain a substantially constant division of load.

A still further object of the invention is to provide an air transport arrangement for a heavy pay load wherein a dynamometer burner control switch is interposed in the balloon load line and is connected to control the supply of fuel to a burner for providing lifting gas for the balloon to allow the helicopter which tows the load to provide a small percentage of required lift.

A still further object of the invention is to provide a balloon towing arrangement wherein the towing helicopter assumes only a small portion of the lift so that a small helicopter can be employed, and wherein the helicopter is not subjected to drastic load changes so that it maintains its stability.

Other objects and advantages and features will become more apparent with the teaching of the principles of the invention in connection with the disclosure of the preferred embodiment thereof in the specification, claims and drawings in which:

FIGURE 1 is a perspective view of a pay load being transported by air in a manner in accordance with the principles of the present invention;

FIGURE 2 is an enlarged detailed perspective view of a mechanism for controlling the lift of the balloon;

FIGURE 3 is a diagrammatic showing of an electrical circuit for controlling balloon lift; and FIGURE 4 is a diagrammatic showing of an electrical circuit for terminating the flight of the balloon.

As shown on the drawings:

FIGURE 1 illustrates an arrangement for transporting a heavy pay load by air, wherein a load lifting balloon of substantial size is provided with harness lines 11 at the base of the balloon supporting a burner 12. The base of the balloon is open and heated gases pass up into the balloon to give it lift. Fuel tanks 13 supply the burner, and the flow of fuel to the burner is regulated by a control valve 14. Bottled fuel such as propane may be employed, although other fuels are suitable. The valve 14 is electrically operated and may conveniently be an on-off valve, although it may be a regulatory valve to obtain a graduated flow.

In one alternate arrangement a constant supply of gas may be provided to the burner through a by-pass line, not shown, to supply enough fuel to the burner to replace lift lost through natural losses such as cooling of the gases and escape through the balloon material. The valve 14 may then be a second valve which supplies fuel to the burner to provide gas thereto in excess of that lost by natural losses so that an increase of lift is immediately felt when valve 14 is opened, and so that a decrease in lift is felt when valve 14 is closed. The actual net lift of the balloon will then fluctuate about its predetermined ideal lift, which is less than the weight of the pay load.

Below the harness lines 11 is a load line arrangement shown by the lines 15, which continue at 16 to connect to a pay load 17. The pay load may take various forms and can consist of heavy loads of supplies, or vehicles, or similar equipment. For example the present arrangement may be used for supporting vehicles, drilling and operating equipment, and fuel to an inaccessible swamp area where oil drilling operations are to proceed or for example to a mountainous area or a frozen area where normal transportation facilities would be completely inadequate.

For controlling the direction of flight of the balloon and transporting the pay load horizontally over the ground, an aircraft such as a helicopter 21 is attached to the balloon and has a tow line 18 connected to the load lines 15 and 16.

Interposed in the load line arrangement 15, 16 is a load sensing device 19, which is shown in one form in detail in FIGURE 2 and will be described later. The tow line 18 is connected below the load sensing device 19.

The helicopter may be provided with additional tow lines such as 20 connected to the top and sides of the balloon and attached to the material thereof in a suitable manner for aiding in pulling the balloon against the resistance of the air as the pay load and the balloon are moved laterally over the surface of the ground.

The balloon may be constructed of various types of materials, although for a hot air balloon a laminated material such as that having a woven nylon fabric on the outer surface with a thin gas impervious material such as polyethylene or Mylar on the inner surface. The balloon may be formed in gores 10a joined at seams 10b by a suitable manner, such as sewing, and some leakage of the balloon envelope can be tolerated since make up heated gas can be supplied from the burner 12.

The load sensing device 19 is shown in detail in FIGURE 2, and is in the form of a dynamometer 22 with a switch 30 carried thereon. The dynamometer shown in one arrangement as being formed of a U-shaped bar wherein the upper leg of the bar has an eyelet 23 secured to it and the lower leg has another eyelet 25 secured to it. Vertical forces on the eyelets 23 and 25 will cause the sides of the dynamometer to spread, and when a predetermined force is applied thereto the switch 30 is actuated. This predetermined force is adjustable by an adjustment bolt 31 which extends through an opening in the lower leg of the dynamometer 22 and is threaded into an opening in the upper leg. Tightening the bolt 31 will increase the force necessary to actuate the switch 30, and loosening the screw will decrease the force necessary for switch actuation. The bolt 31 is shown as an example of an adjustment device, although others may be used, and has a spring 31a between its head and the lower leg of the bar.

The upper eyelet 23 receives a snap 24 which is connected to the upper load lines 15. The lower eyelet receives a snap 27 which is connected to the lower load lines 16 which connect directly to the pay load 17. The eyelet 25 also receives a snap 26 connected to the tow line 18.

As illustrated in FIGURE 3 which shows the circuit for the dynamometer 22, a battery means 33 is connected to a circuit for actuating the valve 14 which for this purpose is solenoid operated, and a main circuit switch 34 is closed when the burner is first lit and is kept closed during normal operation. Switch 30 is normally closed to complete the circuit between the leads 28 and 29, FIGURES 2 and 3, and will open when a maximum predetermined load is felt in the load line 15.

The dynamometer 22 is set so that the helicopter provides a small percentage of the required lift required for the pay load 17. This lift stays the same for all conditions of travel of the balloon with any given load. The lift of the balloon will tend to change, if not controlled, under varying conditions such as change in temperature of the outside air, or leakage of the gas. The free lift or net lift however is maintained constant through the control of the dynamometer 22. The temperoray change in the vertical force applied by the balloon in load line 15 causes an immediate change in the proportion of the load carried by the helicopter since it must make up the difference, or carry the weight not carried by the balloon. The change in net lift of the balloon is measured by the net force applied by the pay load 17 on the dynamometer and this change causes a change in the burner and consequent change in the net lift applied by the balloon 10.

For example, a pay load of 10,000 pounds will be lifted and the balloon will carry 9,500 pounds of the load, so that it is 500 pounds heavy. This 500 pounds will be supported by the helicopter. Should lift conditions of the balloon change, this could upset the helicopter and the pilot could lose control. For example, if the net lift of the balloon should drop so that the load on the tow line 18 begins to increase, this drop in net lift will immediately be sensed by the dynamometer 22 to increase the supply of fuel to the burner and return the net lift to 9,500 pounds. Similarly, if the net lift increases above 9,500 pounds, this will be sensed by the dynamometer to reduce the fuel supplied to the burner thus maintaining a stable allocation of load between the tow line and the balloon for stable transport conditions.

To terminate the flight when the destination is reached, the lifting gas is automatically dumped from the balloon by firing a squib 35 to provide an opening at the balloon top. For example the upper end may be reefed or collected at 39 and held by a line secured by an electrically fired squib. When the squib is fired the balloon material is released to permit the gas to escape through the top. The squib is automatically fired by means which senses the distance of the pay load 17 from the ground, and this may be conveniently performed by a line 38 suspended beneath the pay load and having a ground contact switch 37 at the lower end.

The circuit arrangement is shown in FIGURE 4 wherein a battery provides energy available for firing the squib and when the ground contact switch 37 is closed, the electrical circuit is completed to the squib for firing. An opening of a predetermined size is formed in the top of the balloon so that the balloon rapidly loses its lift to lower the pay load 17 to the ground. The balloon should lose gas with sufficient rapidity to lower the pay load rapidly, but without damaging the pay load, and the balloon should collapse with sufficient rapidity so that it is not caught by the wind to drag the pay load along.

In operation, as the balloon is in flight, a small percentage of the gross weight of the pay load 17 is supported on the tow line 18 by sensing the net weight of the pay load on the load lines 15 of the balloon through the dynamometer 19 which increases the flow of gas to the burner and thus increases the free lift of the balloon as soon as there is a decrease in net load on the load lines 15. Conversely, with an increase in the net load, the fuel supply is immediately reduced to decrease the net lift of the balloon. This maintains a substantially constant load on the helicopter for stable flying conditions.

It will be recognized that the net load on the balloon could be measured in different ways for controlling the burner. Measurement of the vertical lift force applied by the tow line 18 could be made, although since this has a horizontal component of force this would require a more complex mechanism.

Thus it will be seen that I have provided an improved method and apparatus for transporting very large and heavy pay loads which were heretofore untransportable. The mechanism also makes it possible to use helicopters of much smaller size for pay loads and reduces the complexity and cost of transporting such loads.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A system for transporting a heavy pay load by air comprising a load line for connection to a pay load and to a load lifting balloon, a balloon lift control means for controllably varying the free lift of the balloon, a load sensing device interposed in said load line and connected to operate said lift control means as a function of the tension in said load line above said load sensing device, and a tow line for connection to a towing aircraft and for connection to the pay load below said device so that a change in the vertical lift on the pay load by said aircraft will change the load on said sensing device.

2. A mechanism for attachment to the load line of a load transporting balloon having means for controlling the free lift of the balloon comprising a load sensing device for providing a signal which is a function of linear force for connection to the lift control means for the balloon, a connector above said device for connecting to the balloon, a first connector below said device for connecting to a pay load, and a second connector below said device for connecting to an aircraft so that variation in the vertical lift of the aircraft on the pay load will be felt by said load sensing device and the free lift of the balloon will be maintained at a predetermined relationship to the gross weight on the pay load.

3. A mechanism for a load lifting balloon having a valve controlled fuel burner for supplying lifting gas to the balloon comprising a dynamometer for connection to the load line of a balloon, and a burner control switch on the dynamometer for increasing or decreasing the fuel fed to the burner with decrease or increase respectively of the weight of the pay load on the balloon so that a towing aircraft connected to the pay load can continue to provide a constant small percentage of lift.

4. A mechanism for a load lifting balloon having a valve controlled fuel burner for supplying lifting gas to the balloon comprising a dynamometer for connection to the load line of a balloon, a burner control switch on the dynamometer for increasing or decreasing fuel fed to the burner with decrease or increase respectively of the weight of the pay load on the balloon so that a towing aircraft connected to the pay load can continue to provide a constant small percentage of lift, and means for adjusting said switch so that the free lift of the balloon which is maintained by the burner can be adjusted.

5. A system for transporting a heavy pay load by air comprising a load line for connection to a pay load and to a load lifting balloon, for applying a first lifting force, means applying a varying second lifting force to said pay load, a balloon lift control means for controllably varying the free lift of the balloon, and a load sensing device interposed in said load line and connected to operate said lift control means as a function of the tension in said load line at said load sensing device so that change in the vertical lift applied to the pay load by a towing aircraft applying said second force will be felt by said load sensing device and the free lift of the balloon will be changed.

6. A system for transporting a heavy pay load by air comprising a load line for connection to a pay load and to a load lifting balloon, a balloon lift control means for controllably varying the free lift of the balloon, a dynamometer for connection in the load line, a switch operable by the dynamometer at a predetermined tension in the load line for connection to the means for controlling balloon lift, and means on said load line below said dynamometer for connecting to a pay load and to a transporting aircraft so that change in the lift on the pay load by the aircraft will be felt from the dynamometer.

7. A system for transporting a heavy pay load by air comprising a balloon for lifting a heavy pay load, a burner connected to the balloon with a fuel control valve to vary the rate of supplying lifting gas to the balloon, a load line attached to the balloon and adapted for attachment to the pay load, and a load sensing device interposed in said load line and connected to said valve to vary the valve opening as a function of the load on the load line so that a towing aircraft may be connected to the pay load and variation in the vertical component of force applied to the pay load by the aircraft will be sensed by the load sensing device to change the rate of supply of lifting gas as a function of said vertical component of force.

8. A mechanism for transporting heavy pay loads by air comprising means for attaching a balloon to a pay load for lifting the major portion of the weight of the pay load, means for attaching a towing aircraft to the pay load for lifting a small percentage of the weight, means for sensing when the pay load is a predetermined small distance above the ground, and means operated by the sensing means for opening the upper end of the balloon to dump the gas and terminate the flight.

9. The method of transporting a heavy pay load by air which comprises lifting a major portion of the weight of the pay load with a lighter than air balloon, towing the balloon and pay load with an aircraft attached to the pay load and applying a force directly to the pay load independent of the balloon, and varying the free lift of the balloon as a function of the vertical force applied to the pay load by the balloon.

10. The method of transporting a heavy pay load which comprises lifting a major portion of the weight of the pay load with a balloon, towing the balloon with an aircraft attached to the pay load and applying a force directly to the pay load independent of the balloon, measuring the load on the balloon, and increasing the free lift of the balloon with increase of the vertical force applied by the towing aircraft so that a substantially constant small percentage of the required lift will be applied by the aircraft.

References Cited in the file of this patent

UNITED STATES PATENTS

| | | |
|---|---|---|
| 1,035,560 | Erdmann | Aug. 13, 1912 |
| 1,866,079 | Blondin | July 5, 1932 |
| 1,886,245 | Krajac | Nov. 1, 1932 |
| 2,709,054 | Roth | May 24, 1955 |
| 2,930,227 | Spademan et al. | Mar. 29, 1960 |
| 3,017,138 | Flint | Jan. 16, 1962 |

FOREIGN PATENTS

| | | |
|---|---|---|
| 17,383 | Great Britain | June 18, 1903 |